United States Patent
Stebnicki et al.

[19]

[11] Patent Number: 6,086,495
[45] Date of Patent: Jul. 11, 2000

[54] SPLIT SPROCKET ASSEMBLY

[75] Inventors: James C. Stebnicki, Shorewood; Chris M. Plier, Port Washington, both of Wis.

[73] Assignee: Rexnord Corporation, Milwaukee, Wis.

[21] Appl. No.: 09/247,463

[22] Filed: Feb. 9, 1999

[51] Int. Cl.$^7$ .......................... F16H 55/12; F16H 55/46; F16H 55/30
[52] U.S. Cl. ................. 474/96; 474/95; 474/152
[58] Field of Search ................ 474/95, 96, 152, 474/902, 903

[56] References Cited

U.S. PATENT DOCUMENTS

| | | | |
|---|---|---|---|
| 4,506,559 | 3/1985 | Francke et al. | 474/95 |
| 4,631,974 | 12/1986 | Wiegand et al. | 74/450 |
| 5,037,356 | 8/1991 | Gladczak et al. | 474/95 |
| 5,074,406 | 12/1991 | Gundlach et al. | 198/834 |
| 5,170,883 | 12/1992 | Ledet et al. | 198/834 |
| 5,263,575 | 11/1993 | Ledet | 198/834 |
| 5,279,526 | 1/1994 | Gundlach | 474/95 |
| 5,295,917 | 3/1994 | Hannum | 474/95 |
| 5,316,522 | 5/1994 | Carbone et al. | 474/95 |
| 5,322,478 | 6/1994 | Bos et al. | 474/95 |
| 5,378,203 | 1/1995 | Baebel | 474/96 |
| 5,389,044 | 2/1995 | Bandy, Jr. et al. | 474/96 |
| 5,393,271 | 2/1995 | Sands | 474/96 |

OTHER PUBLICATIONS

"Puzzle–Joint Split Sprocket", KVP Falcon Plastic Belting Inc., www.kvpfalcon.com.

Primary Examiner—David A. Bucci
Assistant Examiner—Matthew A. Kaness
Attorney, Agent, or Firm—Qualres & Brady LLP

[57] ABSTRACT

A split sprocket assembly. The sprocket assembly does not require additional separate fasteners and extends substantially parallel to the axis of the drive shaft. Further, the sprocket assembly includes first and second sprocket sections having integrally formed connecting device to connect the sprocket members about the shaft. The connecting device preferably includes a projection formed on one sprocket section and a complementary recess formed on the other sprocket section. The geometry of the projection and the recess is preferably that of a dove-tail shape. The connecting device further includes a device for preventing axial movement of the sprocket sections relative to one another. In one embodiment, the sprocket assembly does not require any additional separate fasteners at all, and the preventing device includes locking members to provide a cylindrical snap fit. In an alternative embodiment, the preventing device includes fasteners extending in a direction perpendicular to a plane including the axis of the shaft and through both sprocket members.

20 Claims, 2 Drawing Sheets

SPLIT SPROCKET ASSEMBLY

BACKGROUND OF THE INVENTION

This invention relates to sprockets for conveyor belts or chains, and, more particularly, to split sprocket assemblies.

A split sprocket assembly generally includes a pair of sprocket sections positioned on opposite sides of a drive shaft. In one type of split sprocket assembly, the sprocket sections are connected together by fasteners extending in the direction of the axis of the shaft. The sprocket sections may also include integrally formed interengaging members, in addition to the separate fasteners, to provide additional connection between the sprocket sections.

U.S. Pat. No. 5,316,522, which issued to Carbone et al., discloses an axially-engaged, abrasion-resistant split sprocket assembly. The split sprocket wheels have interlocking tabs for forming a sprocket wheel assembly. Holes in the vicinity of the tabs admit locking means, such as fasteners, for holding the sprocket sections together in axial compression. Sprocket wheels can be disengaged for removal from the shaft by loosening the locking means and sliding one sprocket section axially with respect to the other sprocket section.

In another type of split sprocket assembly, the sprocket sections are connected together by fasteners extending across the drive shaft. The fasteners extend through portions of both sprocket sections. See, for example, U.S. Pat. No. 5,389,044, which issued to Bandy et al.

SUMMARY OF THE INVENTION

One problem with some conventional split sprocket assemblies is that additional separate fasteners are required to connect the sprocket sections about the drive shaft. As a result, assembly and disassembly of the split sprockets is more difficult and time consuming. Also, these fasteners are not easily accessible when several sprocket assemblies are assembled adjacent to one another. Further, additional tools are required to assemble the additional external fasteners. In addition, due to the addition of separate fasteners, manufacture of the conventional split sprocket assembly is more difficult and more expensive.

Another problem with some conventional split sprocket assemblies is that, in order to accommodate the additional separate fasteners, bores must be formed in the sprocket sections. This limits the strength of the material of the sprocket section surrounding the bore. In such designs, the mode of failure of the sprocket assembly is typically by the fastener breaking through the material of the sprocket section around the bore.

Yet another problem with some conventional split sprocket assemblies is that the addition of bores for the fasteners limits the size of the opening to accommodate the drive shaft. Therefore, a larger split sprocket assembly must be used to accommodate a drive shaft of a given diameter.

The present invention provides an improved sprocket assembly that alleviates the problems of conventional split sprocket assemblies. The invention provides a sprocket assembly which does not require additional separate fasteners extending substantially parallel to the axis of the drive shaft. In one embodiment, the sprocket assembly does not require any additional separate fasteners at all. In another embodiment, the sprocket assembly includes additional separate fasteners which extend substantially perpendicular to a plane including the axis of the drive shaft.

Further, the invention provides a sprocket assembly including first and second sprocket sections having integrally formed connecting means to connect the sprocket members about the shaft. The connecting means preferably includes a projection formed on one sprocket section and a complementary recess formed on the other sprocket section. The geometry of the projection and the recess is preferably that of a dove-tail shape. In other embodiments, the geometry of the projection and the recess could be that of a T-shape.

Preferably, the connecting means further includes means for preventing axial movement of the sprocket sections relative to one another. In one embodiment, the connecting means are integrally formed on at least one of the sprocket sections, and the preventing means does not include any additional separate fasteners. In this embodiment, the preventing means preferably includes interengaging locking members providing a cylindrical snap fit. In other constructions, the locking members may provide a cantilever snap fit.

In an alternative embodiment, the preventing means includes additional separate fasteners which do not extend in a direction substantially parallel to the axis of the shaft. Preferably, the fasteners extend in a direction perpendicular to a plane including the axis of the shaft and through both sprocket members.

An advantage of the present invention is that, in the one embodiment, no additional separate fasteners are required to connect the sprocket members. As a result, assembly of the split sprocket members is easier and less time consuming. Also, no additional tools are required to assemble the sprocket assembly. Further, because there are fewer components, manufacture of the sprocket assembly is easier and less costly.

Another advantage of the present invention is that, in one embodiment, because bores to accommodate separate fasteners are not required, the strength of the sprocket members is not limited by the material formed about these bores.

Yet another advantage of the present invention is that the size of the opening for the shaft is not limited by the additional bores. Therefore, a comparably smaller sprocket assembly can be used with a drive shaft of a given diameter, reducing the space required to accommodate the sprocket assembly.

Other features and advantages of the invention will become apparent to those skilled in the art upon review of the following detailed description, claims and drawings.

Figure 1:
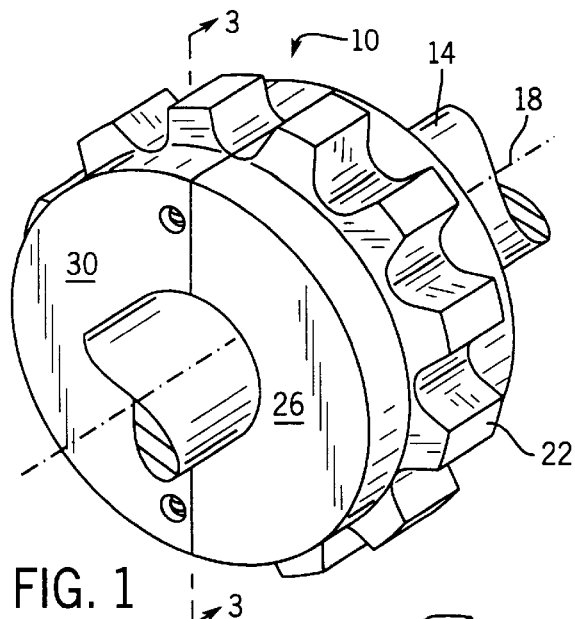
FIG. 1 is a perspective view of a sprocket assembly embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A sprocket assembly 10 embodying the invention is illustrated in FIG. 1. The sprocket assembly 10 is assembled on a shaft 14 so that the sprocket assembly 10 is rotatable about a shaft axis 18. In the illustrated construction, the sprocket assembly 10 is rotatable relative to the shaft 14. The sprocket assembly 10 includes teeth 22 formed on the outer surface. The teeth 22 are engageable in recesses (not shown) formed in a conveyor belt or chain (not shown). In other constructions (not shown), the sprocket assembly 10 is connected to the shaft 14 and rotatably driven by the shaft 14. In these constructions, the sprocket assembly 10 drives the belt or chain.

The sprocket assembly 10 includes (see FIGS. 1–5) first and second sprocket sections or sprocket components 26 and 30. The sprocket sections 26 and 30 include a plurality of teeth 22 formed on the respective outer surfaces so that, when the sprocket assembly 10 is assembled, a continuous toothed outer surface or "tooth profile" is formed.

The sprocket sections 26 and 30 also include respective inner surfaces 32 and 33 which are engageable with the outer surface of the shaft 14. The inner surfaces 32 and 33 of the sprocket sections 26 and 30 are complementary to the shape of the outer surface of the shaft 14 so that, in the illustrated construction, the sprocket assembly 10 rotates on the shaft 14.

In other constructions (not shown), the shape of the inner surfaces 32 and 33 of the sprocket sections 26 and 30 and the shape of the outer surface of the shaft 14 may be such that the sprocket assembly 10 is connected to the shaft 14 and driven by the shaft 14. Alternatively, a combination of a key (not shown) and a complementary keyway (not shown) may be formed on the sprocket assembly 10 and the shaft 14 to connect the sprocket assembly 10 to the shaft 14.

The sprocket sections 26 and 30 also include respective opposite end faces 34 and 38. When the sprocket assembly 10 is assembled, the opposite end faces 34 and 38 of the first sprocket section 26 respectively engage the opposite end faces 34 and 38 of the second sprocket section 30.

The sprocket assembly 10 also includes means for connecting the sprocket sections 26 and 30 without any additional separate fasteners extending substantially parallel to the axis 18. As explained in more detail below, when the connecting means are engaged, the sprocket sections 26 and 30 are prevented from separating and moving relative to one another, both axially and radially.

In the illustrated construction, the connecting means includes an axially-extending first connecting member or projection 42 integrally formed on each opposite end face 34 and 38 of the first sprocket section 26. The connecting means also includes a complementary axially-extending and axially-opening second connecting member or recess 46 formed on each opposite end face 34 and 38 of the second sprocket section 30. The projections 42 are axially slidable into the corresponding recesses 46 to connect the sprocket sections 26 and 30 about the shaft 14.

In other constructions (not shown), a projection 42 may be formed on the end face 34 of the first sprocket section 26 and on the end face 38 of the second sprocket section 30. A recess 46 may be formed on the end face 38 of the first sprocket section 26 and on the end face 34 of the second sprocket section 30. In such a construction, the sprocket sections 26 and 30 would be identical and substitutable.

Preferably, the projections 42 and the recesses 46 have a complementary dove-tail configuration. This structural configuration provides improved strength in the connection of the sprocket sections 26 and 30 as the sprocket assembly 10 transmits torque from the shaft 14 to the belt or chain. It should be understood, however, that the projections 42 and recesses 46 may have other configurations, such as a T-shape, while still providing improved strength and torque transmission.

The connecting means also includes means for preventing axial movement of the sprocket sections 26 and 30 relative to one another. The preventing means prevents the sprocket assembly 10 from separating without operator action. Also, the preventing means does not include any additional separate fasteners extending substantially parallel to the axis 18.

In one embodiment (see FIGS. 1–4), the preventing means does not include any additional separate fasteners. In this embodiment, the preventing means includes a locking projection 50 integrally formed on the axial end of each projection 42 and a complementary locking recess 54 formed in the axial end wall the each recess 46. Each locking projection 50 engages the corresponding locking recess 54 to provide a cylindrical snap fit.

In other constructions (not shown), each locking projection 50 may engage in the corresponding locking recess 54 to provide a cantilever snap fit. Also, in other constructions (not shown), a locking projection 50 may be formed on only one of the projections 42 and a complementary locking recess 54 may be formed only in the axial end wall of the corresponding recess 46.

In another embodiment (see FIG. 5), the preventing means includes additional separate fasteners which do not extend substantially parallel to the axis 18. In this embodiment, the preventing means includes separate fasteners 58, such as set screws. The fasteners 58 extend through respective bores 62 defined in the sprocket sections 26 and 30. The bores 62 do not extend substantially parallel and, preferably, extend perpendicular to a plane including the axis 18.

In this embodiment, the sprocket sections 26 and 30 are positioned on the shaft 14 so that the bores 62 are aligned. The fasteners 58 are threadedly engaged in respective threaded portions formed in the bores 62 to prevent axial movement of the sprocket sections 26 and 30. Alternatively, the preventing means may include nuts (not shown) threadedly engageable with the respective fasteners 58.

The sprocket assembly 10 is preferably formed in a molding process to provide the above-described structural configuration. The sprocket assembly 10 is formed of thermoplastic material, such as nylon, acetal or polyketone. Preferably, the sprocket assembly 10 is formed of polyurethane. It should be understood, however, that the sprocket assembly 10 can be formed using different manufacturing processes and materials.

Figure 2:
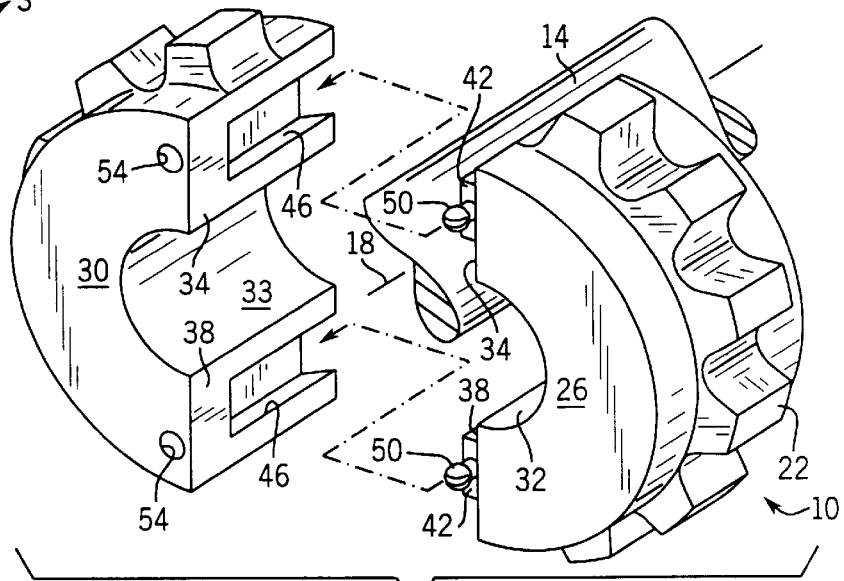
FIG. 2 is a perspective view of the sprocket assembly shown in FIG. 1 and illustrating the sprocket assembly in a disassembled condition.
Figure 4:
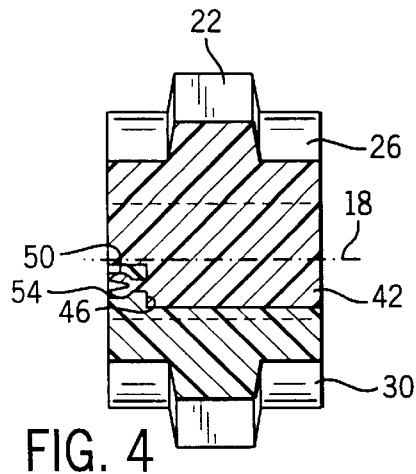
FIG. 4 is a partial cross-sectional view taken generally along line 4—4 in FIG. 3.
Figure 3:
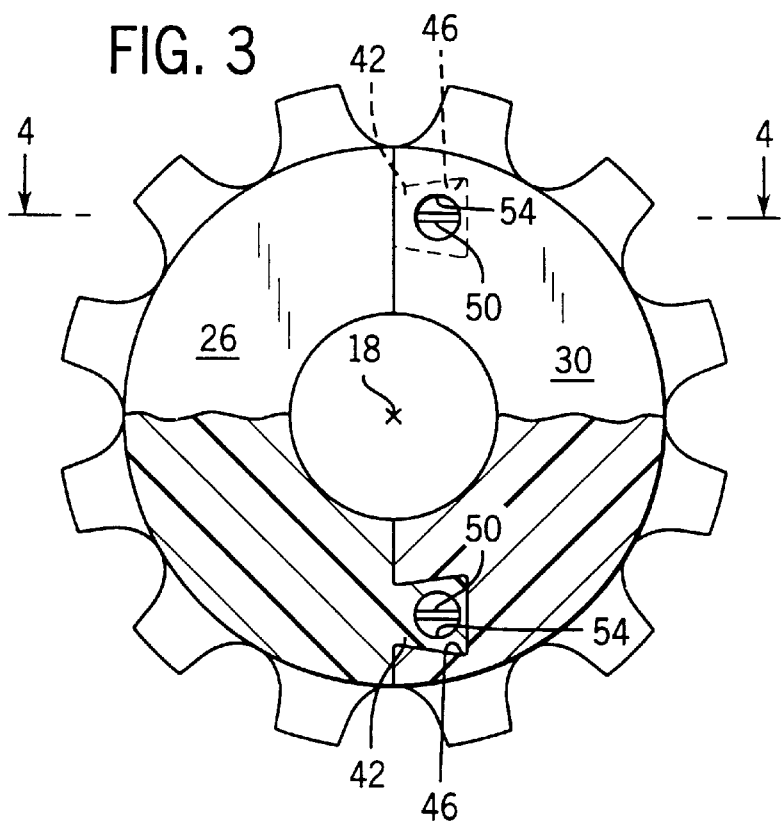
FIG. 3 is a partial cross-sectional view taken generally along line 3—3 in FIG. 1.
Figure 5:
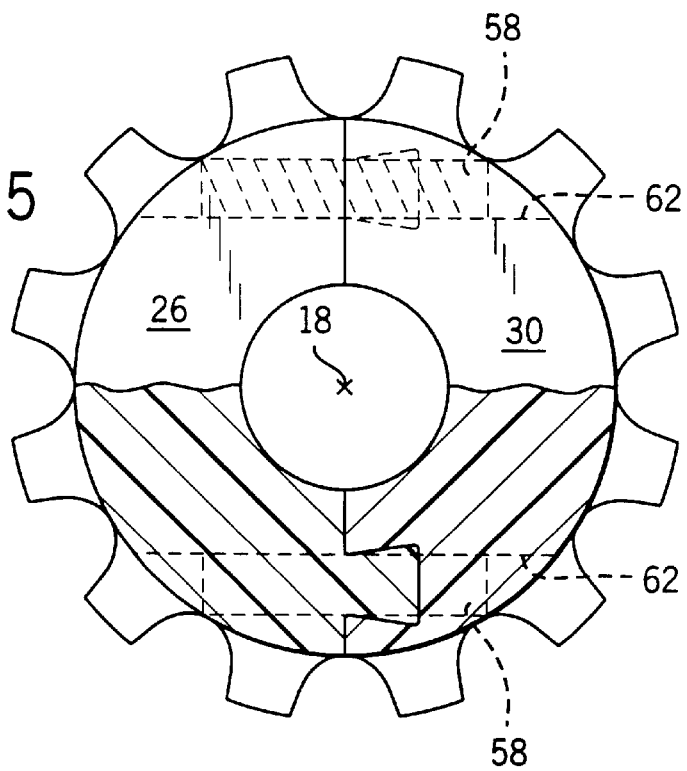
FIG. 5 is a partial cross-sectional view similar to that in FIG. 3 and illustrating an alternative embodiment of the preventing means.

To assemble the sprocket assembly 10, the sprocket sections 26 and 30 are positioned on the shaft 14 as shown in FIG. 2. The sprocket sections 26 and 30 are then moved in opposite directions along the axis 18 toward one another so that the projections 42 engage in the recesses 46, as shown in FIGS. 3 and 5.

To prevent axial movement of the sprocket sections 26 and 30 relative to one another, the preventing means are engaged. In the one embodiment (see FIGS. 1–4), the sprocket sections 26 and 30 are moved toward one another on the shaft 14 until the locking projections 50 engage the locking recesses 54 to provide a snap fit. In the alternative embodiment (see FIG. 5), the sprocket sections 26 and 30 are positioned so that the bores 62 are aligned, and then the fasteners 58 are threaded into the threaded portions. In either embodiment, when the connecting means are engaged, the sprocket sections 26 and 30 are prevented from both axial and radial movement relative to one another.

To remove the sprocket assembly 10 from the shaft 14, the preventing means are first disengaged. In the one embodiment (see FIGS. 1–4), the locking projections 50 are disengaged from the locking recesses 54 by moving the sprocket sections 26 and 30 in opposite axial directions away from one another. In the alternative embodiment (see FIG. 5), the fasteners 58 are unthreaded from the threaded portions and removed from the bores 62.

After the preventing means are disengaged, the sprocket sections 26 and 30 are slid in opposite axial directions away from one another until the projections 42 are removed from the recesses 46. The sprocket sections 26 and 30 may then be removed from the shaft 14.

Various features of the invention are set forth in the following claims.

We claim:

1. A sprocket assembly for use with a shaft having an axis, said sprocket assembly comprising:

a first sprocket section;

a second sprocket section; and means for connecting said first sprocket section and said second sprocket section about the shaft without a separate fastener, said connecting means extending substantially parallel to the axis, said connecting means being engageable to substantially prevent axial movement of said first sprocket section relative to said second sprocket section.

2. The sprocket assembly as set forth in claim 1 wherein said connecting means does not include any separate fasteners.

3. The sprocket assembly as set forth in claim 1 wherein said connecting means are integrally formed on at least one of said first sprocket section and said second sprocket section.

4. The sprocket assembly as set forth in claim 1 wherein the connecting means includes a separate fastener extending through said first sprocket section and through said second sprocket section, said fastener not extending substantially parallel to the axis.

5. The sprocket assembly as set forth in claim 4 wherein said fastener extends substantially perpendicular to a plane including the axis.

6. A sprocket assembly for use with a shaft having an axis, said sprocket assembly comprising:

a first sprocket section;

a second sprocket section; and means for connecting said first sprocket section and said second sprocket section about the shaft, said connecting means including a first connecting member formed on one of said first sprocket section and said second sprocket section, a second connecting member formed on the other of said first sprocket section and said second sprocket section, said first connecting member being engageable with said second connecting member to connect said first sprocket section and said second sprocket section, and means for preventing axial movement of said first sprocket section relative to said second sprocket section, said preventing means not including a separate fastener, said preventing means extending substantially parallel to the axis.

7. The sprocket assembly as set forth in claim 6 wherein said first connecting member is a projection, wherein said second connecting member is a recess, and wherein said projection is engageable in said recess to connect said first sprocket section and said second sprocket section.

8. The sprocket assembly as set forth in claim 7 wherein said recess and said projection have a complementary dovetail configuration.

9. The sprocket assembly as set forth in claim 7 wherein said recess and said projection extend substantially parallel to the axis of the shaft.

10. The sprocket assembly as set forth in claim 9 wherein said projection is slidable into said recess in a direction parallel to the axis.

11. The sprocket assembly as set forth in claim 7 wherein a wall defines said recess, wherein a portion of said projection faces said wall, wherein a locking projection is formed on one of said portion of said projection and said wall, wherein a locking recess is formed in the other of said portion of said projection and said wall, and wherein said locking projection engages said locking recess to prevent axial movement of said first sprocket section relative to said second sprocket section.

12. The sprocket assembly as set forth in claim 6 wherein said preventing means substantially prevents said first connecting member from being disengaged from said second connecting member.

13. The sprocket assembly as set forth in claim 6 wherein said preventing means includes a locking projection formed on one of said first sprocket section and said second sprocket section, and a complementary locking recess formed on the other of said first sprocket section and said second sprocket section, said locking projection being engageable in said locking recess to prevent axial movement of said first sprocket section relative to said second sprocket section.

14. The sprocket assembly as set forth in claim 13 wherein said locking projection is engageable in said locking recess in a direction generally parallel to the axis.

15. The sprocket assembly as set forth in claim 6 wherein said preventing means includes a separate fastener extending through said first sprocket section and through said second sprocket section to prevent axial movement of said first sprocket section relative to said second sprocket section, and wherein said fastener does not extend substantially parallel to the axis.

16. The sprocket assembly as set forth in claim 15 wherein said fastener extends substantially perpendicular to a plane including the axis.

17. A sprocket assembly for use with a shaft having an axis, said sprocket assembly comprising:

a first sprocket section having opposite ends;

a second sprocket section having opposite ends; and means for connecting said first sprocket section and said second sprocket section about the shaft, said connecting means including first and second recesses, said first recess being formed in one of said one opposite end of said first sprocket section and said one opposite end of said second sprocket section, said second recess being formed in one of said other opposite end of said first sprocket section and said other opposite end of said second sprocket section, first and second projections, said first projection being formed on the other of said one opposite end of said first sprocket section and said one opposite end of said second sprocket section, said second projection being formed in the other of said other opposite end of said first sprocket section and said other opposite end of said second sprocket section, said first and second projections respectively engaging said first and second recesses to connect said first sprocket section and said second sprocket section, and means for preventing axial movement of said first sprocket member relative to said second sprocket member without a separate fastener, said preventing means extending substantially parallel to the axis.

18. The sprocket assembly as set forth in claim 17 wherein a first wall defines said first recess and a second wall defines said second recess, wherein a portion of said first projection faces said first wall and a portion of said second projection faces said second wall, wherein said preventing means includes a first locking projection formed on one of said portion of said first projection and said first wall, a first locking recess formed in the other of said portion of said first projection and said first wall, a second locking projection formed on one of said portion of said second projection and said second wall, and a second locking recess formed in the other of said portion of said second projection and said second wall, said first locking projection engaging said first locking recess and said second locking projection engaging said second locking recess to prevent axial movement of said first sprocket section relative to said second sprocket section.

19. The sprocket assembly as set forth in claim 18 wherein said first locking projection and said second locking projection are respectively engageable with said first locking recess and said second locking recess in a direction generally parallel to the axis.

20. The sprocket assembly as set forth in claim 17 wherein said preventing means includes a fastener extending through said first sprocket section and through said second sprocket section to prevent axial movement of said first sprocket section relative to said second sprocket section, said fastener extending substantially perpendicular to a plane including the axis.

* * * * *